(12) United States Patent
Zhou et al.

(10) Patent No.: US 12,308,678 B2
(45) Date of Patent: May 20, 2025

(54) CONVERSION POWER SUPPLY AND AUTONOMOUS ELECTRIC ENERGY REPLENISHMENT METHOD FOR ENERGY STORAGE SYSTEM

(71) Applicant: Sungrow Power Supply Co., Ltd., Hefei (CN)

(72) Inventors: Jianjie Zhou, Hefei (CN); Xiaohui Cao, Hefei (CN); Fanglin Chen, Hefei (CN); Zihao Zhao, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 34 days.

(21) Appl. No.: 18/351,444

(22) Filed: Jul. 12, 2023

(65) Prior Publication Data

US 2024/0128770 A1    Apr. 18, 2024

(30) Foreign Application Priority Data

Oct. 17, 2022    (CN) .................... 202211266028.0

(51) Int. Cl.
*H02J 7/34*    (2006.01)
*H02J 7/00*    (2006.01)
(Continued)

(52) U.S. Cl.
CPC ........ *H02J 7/00306* (2020.01); *H02J 7/0013* (2013.01); *H02J 7/0014* (2013.01);
(Continued)

(58) Field of Classification Search
CPC ....... B60L 58/14; H02J 7/0013; H02J 7/0014; H02J 7/00306; H02J 7/0068; H02J 7/02;
(Continued)

(56) References Cited

U.S. PATENT DOCUMENTS

2004/0112320 A1*  6/2004  Bolz .................... H02J 7/1423
                                                                290/31
2009/0021198 A1*  1/2009  Okamura ................. B60L 3/00
                                                                903/902
(Continued)

FOREIGN PATENT DOCUMENTS

CN           216252245 U      4/2022

OTHER PUBLICATIONS

EP23186531.2, Apr. 23, 2024, Extended European Search Report.
Extended European Search Report for European Application No. 23186531.2, dated Apr. 23, 2024.

*Primary Examiner* — Levi Gannon
(74) *Attorney, Agent, or Firm* — Wolf, Greenfield & Sacks, P.C.

(57) ABSTRACT

A conversion power supply and an autonomous electric energy replenishment method for an energy storage system are provided. An output terminal of the power supply module is connected to a second side of a first DC-DC converter through an energy storage element. A first side of the first DC-DC converter is connected to battery clusters of the energy storage system through a DC interface of the conversion power supply, so that under control by a conversion power supply controller, in a case that a voltage of a battery cluster is lower than a preset threshold, the first DC-DC converter receives the electric energy on the second side, and transmit the electric energy to the first side of the first DC-DC converter, to realize a electric energy replenishment function for at least one of the battery clusters and prevent battery failure due to over-discharge.

20 Claims, 8 Drawing Sheets

(51) Int. Cl.
   H02M 3/155   (2006.01)
   H02M 3/335   (2006.01)
   H02M 7/537   (2006.01)

(52) U.S. Cl.
   CPC .............. H02J 7/342 (2020.01); H02J 7/345 (2013.01); H02M 3/155 (2013.01); H02M 3/33576 (2013.01); H02M 7/537 (2013.01); *H02J 2207/20* (2020.01)

(58) Field of Classification Search
   CPC .... H02J 7/34; H02J 7/342; H02J 7/345; H02J 2207/20; H02M 3/155; H02M 3/33576; H02M 7/537

See application file for complete search history.

(56) References Cited

U.S. PATENT DOCUMENTS

| | | | |
|---|---|---|---|
| 2010/0019729 A1* | 1/2010 | Kaita | H02J 7/1423 320/134 |
| 2010/0209792 A1* | 8/2010 | Umayahara | B60L 58/40 429/429 |
| 2010/0315043 A1 | 12/2010 | Chau | |
| 2011/0101915 A1* | 5/2011 | Mitsutani | B60L 53/305 320/109 |
| 2011/0266868 A1* | 11/2011 | Yamamoto | B60L 58/15 320/134 |
| 2011/0273148 A1* | 11/2011 | Ueno | H02P 9/48 322/28 |
| 2011/0288710 A1* | 11/2011 | Ito | B60W 10/06 180/65.265 |
| 2013/0285476 A1* | 10/2013 | Nakano | H02J 7/0063 307/150 |
| 2014/0340044 A1* | 11/2014 | Kim | H02J 7/0014 320/134 |

* cited by examiner

CONVERSION POWER SUPPLY AND AUTONOMOUS ELECTRIC ENERGY REPLENISHMENT METHOD FOR ENERGY STORAGE SYSTEM

The present application claims priority to Chinese Patent Application No. 202211266028.0, titled "CONVERSION POWER SUPPLY AND AUTONOMOUS ELECTRIC ENERGY REPLENISHMENT METHOD FOR ENERGY STORAGE SYSTEM", filed on Oct. 17, 2022 with the China National Intellectual Property Administration, which is incorporated herein by reference in its entirety.

FIELD

The present disclosure relates to the technical field of power electronics, and in particular to a conversion power supply and an autonomous electric energy replenishment method for an energy storage system.

BACKGROUND

With extensive installation and application of energy storage systems, the problem of battery over-discharge is becoming increasingly apparent. For example, when a supporting subsystem of a battery, such as a power conversion system (PCS) and other devices in a main circuit, is abnormal, a battery system cannot be charged and discharged normally through the PCS for a long time in a case of untimely maintenance, and the self-discharge rate of the battery leads to a high risk of failure of the battery system due to over-discharge. In the conventional technology, the battery can only be charged by using an independent charging tool when the battery failure due to over-discharge is discovered.

Therefore, there is an urgent need for a solution for preventing the battery failure due to over-discharge in an energy storage system.

SUMMARY

A conversion power supply and an autonomous electric energy replenishment method for an energy storage system are provided by the present disclosure, to prevent battery failure due to over-discharge.

The present disclosure provides the following technical solutions.

According to a first aspect of the present disclosure, a conversion power supply of an energy storage system is provided, which includes: a conversion power supply controller, an energy storage element, a first DC-DC converter and a power supply module, where
  a first side of the first DC-DC converter is connected to one or more battery clusters in the energy storage system through a DC interface of the conversion power supply;
  a second side of the first DC-DC converter and an output terminal of the power supply module are connected to the energy storage element;
  an input terminal of the power supply module is connected to an external power supply through a power supply interface of the conversion power supply;
  the conversion power supply controller is configured to, based on determination that a voltage of a battery cluster among the one or more battery clusters is lower than a preset threshold, control the power supply module to output electric energy to the energy storage element, and control the first DC-DC converter to transmit electric energy received on the second side of the first DC-DC converter to the first side of the first DC-DC converter to replenish electric energy of the battery cluster.

In an embodiment, the conversion power supply further includes: a first switch unit, where
  ports on a first side of the first switch unit are respectively connected to interfaces in the DC interface of the conversion power supply;
  a second side of the first switch unit is connected to the first side of the first DC-DC converter; and
  the first switch unit is controlled by the conversion power supply controller to selectively connect one of the ports on the first side of the first switch unit to the second side of the first switch unit.

In an embodiment, the conversion power supply controller is further configured to control the first DC-DC converter to transmit the electric energy received on the second side of the first DC-DC converter to the first side of the first DC-DC converter, and transmit the electric energy to a corresponding one of the interfaces in the DC interface of the conversion power supply through the first switch unit, to balance electric energy among the one or more battery clusters.

In an embodiment, the DC interface of the conversion power supply further includes an interface connected to a DC bus for external connection of the energy storage system.

In an embodiment, the conversion power supply controller is further configured to control the first DC-DC converter to transmit the electric energy received on the second side of the first DC-DC converter to the first side of the first DC-DC converter, and transmit the electric energy to the interface in the DC interface of the conversion power supply that is connected to the DC bus through the first switch unit, to establish a slow start voltage on the DC bus.

In an embodiment, the conversion power supply further includes: a second DC-DC converter, where
  a first side of the second DC-DC converter is connected to the energy storage element;
  a second side of the second DC-DC converter is connected to a DC load in the energy storage system through a load interface of the conversion power supply;
  the conversion power supply controller is further configured to: control the power supply module to output electric energy to the energy storage element, and control the second DC-DC converter to supply power to the DC load.

In an embodiment, the first DC-DC converter is a bidirectional DC-DC converter; and
  the conversion power supply controller is further configured to: control the first DC-DC converter to transmit electric energy received on the first side of the first DC-DC converter to the second side of the first DC-DC converter and output the electric energy to the energy storage element instead of the power supply module, to cause the second DC-DC converter to supply power to the DC load.

In an embodiment, a topology of the first DC-DC converter is a single-topology, a dual-topology or a multi-topology of any one of: a bidirectional BUCK-BOOST topology, a bidirectional BOOST-BUCK topology, a bidirectional Cuk topology and a bidirectional Sepic-Zeta topology;

a topology of the first DC-DC converter is a phase-shift full-bridge topology; or a topology of the first DC-DC converter is any one of: a full-bridge isolation voltage source topology, an isolation voltage source topology with a primary side half-bridge circuit and a secondary side push-pull circuit, a full-bridge isolation current source topology, and an isolation current source topology with a primary side push-pull circuit and a secondary side hybrid-bridge circuit.

In an embodiment, the second DC-DC converter is a unidirectional buck converter or an isolation buck converter.

In an embodiment, the DC load includes at least one of: the conversion power supply controller, a security controller in the energy storage system, a temperature control unit controller, a battery system controller, a cluster-level management unit controller and a battery over-discharge alarm buzzer.

In an embodiment, the power supply module is an AC-DC converter; and the external power supply includes: a mains supply and at least one alternator.

In an embodiment, the AC-DC converter is an uncontrolled rectification converter.

In an embodiment, the conversion power supply further includes a second switch unit, where ports on a first side of the second switch unit are respectively connected to interfaces in the power supply interface;

a second side of the second switch unit is connected to the input terminal of the power supply module;

the second switch unit is controlled by the conversion power supply controller to selectively connect one of the ports on the first side of the second switch unit to the second side of the second switch unit.

In an embodiment, the energy storage element is any one of: an electrolytic capacitor, a metal film capacitor, a lithium capacitor and a lead-acid battery.

According to a second aspect of the present disclosure, an autonomous electric energy replenishment method for an energy storage system, applied to the conversion power supply controller in the conversion power supply of an energy storage system according to any one of the above embodiments of the first aspect, is provided, which includes:

determining whether a voltage of a battery cluster among the one or more battery clusters in the energy storage system is lower than a preset threshold;

based on determination that the voltage of the battery cluster is lower than the preset threshold, controlling the power supply module in the conversion power supply to operate, and controlling the first DC-DC converter to transmit the electric energy received on the second side of the first DC-DC converter to the first side of the first DC-DC converter, and transmitting the electric energy to the battery cluster through the DC interface.

In an embodiment, the conversion power supply includes a first switch unit, and after the first DC-DC converter transmits the electric energy received on the second side of the first DC-DC converter to the first side of the first DC-DC converter, and the autonomous electric energy replenishment method further includes:

controlling the first switch unit to act, to transmit the electric energy to the battery cluster with the voltage lower than the preset threshold.

In an embodiment, the autonomous electric energy replenishment method further includes:

determining whether electric energies of the battery clusters are balanced;

based on determination that an unbalanced battery cluster exists, controlling the power supply module to operate and controlling the first DC-DC converter to transmit the electric energy received on the second side of the first DC-DC converter to the first side of the first DC-DC converter, and transmitting the electric energy to the unbalanced battery cluster through the first switch unit.

In an embodiment, the autonomous electric energy replenishment method further includes:

determining whether a slow-start voltage is to be established for a DC bus for external connection of the energy storage system;

based on determination that the slow-start voltage is to be established for the DC bus, controlling the power supply module to operate, and controlling the first DC-DC converter to transmit the electric energy received on the second side of the first DC-DC converter to the first side of the first DC-DC converter, and transmitting the electric energy to the DC bus through the first switch unit.

In an embodiment, the external power supply connected to the conversion power supply include a mains supply and at least one alternator, the conversion power supply includes a second switch unit, and the controlling the power supply module in the conversion power supply to operate includes:

determining whether the mains supply is normal;

based on determination that the mains supply is normal, controlling the power supply module to receive electric energy supplied by the mains supply through the second switch unit and output the electric energy to the energy storage element in the conversion power supply;

based on determination that the mains supply is abnormal, determining whether the at least one alternator supplies power normally;

based on determination that the at least one alternator supplies power normally, controlling the power supply module to receive electric energy supplied by the at least one alternator through the second switch unit and output the electric energy to the energy storage element; and based on determination that no alternator supplies power normally, triggering an alarm buzzer.

In an embodiment, the external power supply connected to the conversion power supply include a mains supply and at least one alternator, the conversion power supply includes a first switch unit, a second switch unit and a second DC-DC converter, and after the determining whether a voltage of a battery cluster among the one or more battery clusters in the energy storage system is lower than the preset threshold, the autonomous electric energy replenishment method further includes:

based on determination that a voltage of no battery cluster among the one or more battery clusters is lower than the preset threshold, determining whether the mains supply is normal;

based on determination that the mains supply is normal, controlling the power supply module to receive electric energy supplied by the mains supply through the second switch unit, convert and output the electric energy to the energy storage element in the conversion power supply, and controlling the second DC-DC converter to transmit the electric energy received on a first side of the second DC-DC converter to a second side of the second DC-DC converter;

based on determination that the mains supply is abnormal, controlling the first DC-DC converter to successively receive, through the first switch unit, electric energy from at least one of the one or more battery clusters or receive electric energy from a DC bus for external connection of the energy storage system, convert and output the electric energy to the energy storage element, and controlling the second DC-DC converter to transmit the electric energy received on the first side of the second DC-DC converter to the second side of the second DC-DC converter.

In the conversion power supply of an energy storage system according to the present disclosure, the input terminal of the power supply module is connected to the external power supply through the power supply interface of the conversion power supply. The output terminal of the power supply module is connected to the second side of the first DC-DC converter through the energy storage element, so that the electric energy received through the input terminal of the power supply module can be outputted to the first DC-DC converter through the energy storage element. Moreover, the first side of the first DC-DC converter is connected to the battery clusters of the energy storage system through the DC interface of the conversion power supply, so that in a case that a voltage of a battery cluster among the battery clusters is lower than the preset threshold, the first DC-DC converter can receive the electric energy from the energy storage element, i.e. the electric energy on the second side of the first DC-DC converter, and transmit the electric energy to the first side of the first DC-DC converter, under control by the conversion power supply controller, so as to replenish electric energy of at least one battery cluster among the battery clusters and prevent battery failure due to over-discharge.

BRIEF DESCRIPTION OF THE DRAWINGS

In order to clearly illustrate technical solutions in the embodiments of the present disclosure or the conventional technology, the accompanying drawings used in the description of the embodiments or the conventional technology is briefly described below. It is apparent that the accompanying drawings in the following description are only for the embodiments of the present disclosure. For those skilled in the art, other drawings can be obtained based on the provided accompanying drawings without creative efforts.

DETAILED DESCRIPTION OF EMBODIMENTS

The technical solutions according to the embodiments of the present disclosure are clearly and completely described below in conjunction with the accompanying drawings of the embodiments of the present disclosure. Obviously, the described embodiments are only a part of the embodiments of the present disclosure, not all of them. Based on the embodiments of the present disclosure, other embodiments obtained by those skilled in the art without creative efforts are within the protection scope of the present disclosure.

In the present disclosure, terms such as "comprise", "include", or any other variation thereof are intended to cover non-exclusive inclusion, such that a process, a method, article, or device that includes a series of elements not only includes the series of elements, but also other elements not explicitly listed, or further includes elements inherent in such a process, method, article, or device. Without further limitations, an element limited by the statement "comprise . . . " does not exclude the existence of other identical element in the process, method, article, or device that includes the element.

A conversion power supply of an energy storage system is provided according to the present disclosure to prevent battery failure due to over-discharge.

Figure 1:
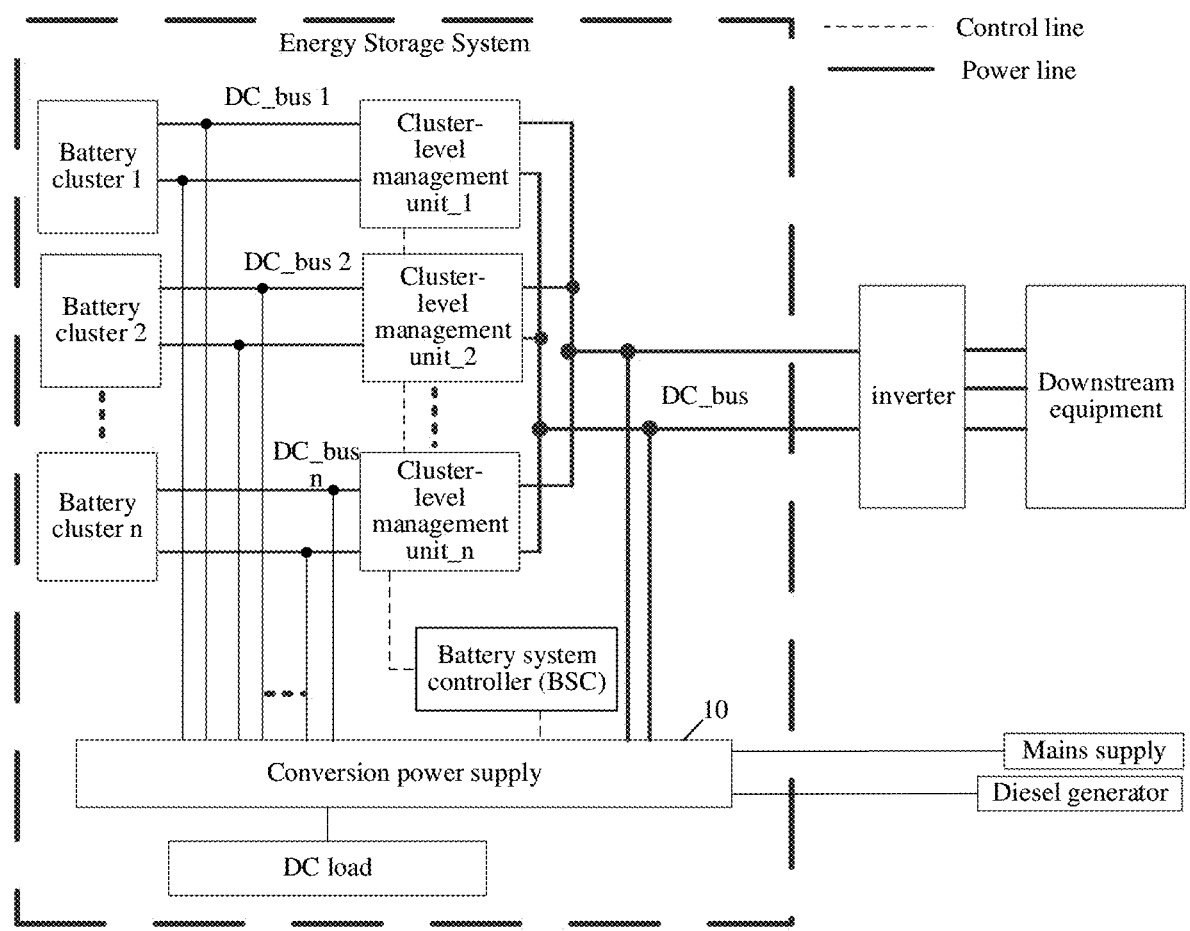
FIG. 1 is a schematic structural diagram of an energy storage system according to an embodiment of the present disclosure.

As shown in FIG. 1, an energy storage system includes: a battery system controller (BSC), one or more battery clusters (for example, Battery cluster 1 to Battery cluster n as shown in FIG. 1) and one or more cluster-level management units thereof (for example, Cluster-level management unit_1 to Cluster-level management unit_n as shown in FIG. 1), and a conversion power supply 10. The one or more battery clusters are connected in parallel to a DC bus DC_BUS through the cluster-level management units respectively corresponding to the one or more battery clusters, and are connected to an external component through the DC bus DC_BUS. For example, the one or more battery clusters may be connected to a DC bus of a power conversion system (PCS) and connected to a downstream device such as a power grid or an AC load through the PCS. Each of the cluster-level management units is controlled by the BSC, and the BSC is communicatively connected to the conversion power supply 10.

Figure 2A:
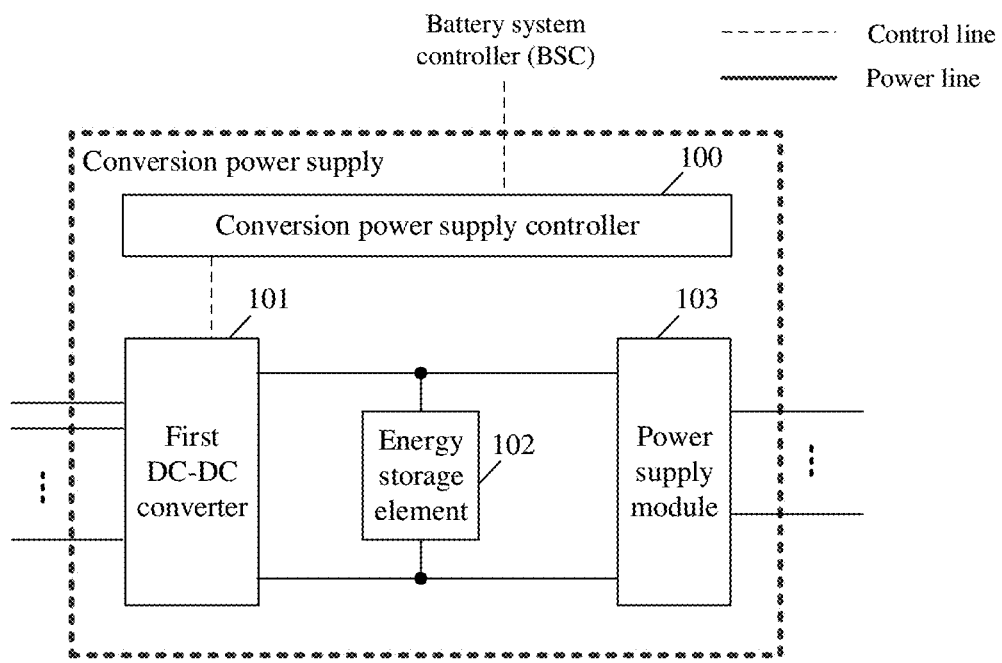
FIG. 2*a* is a schematic structural diagram of a conversion power supply of an energy storage system according to an embodiment of the present disclosure.

Referring to FIG. 2*a*, the conversion power supply 10 of the energy storage system includes: a conversion power supply controller 100, an energy storage element 102, a first DC-DC converter 101 and a power supply module 103.

A first side of the first DC-DC converter 101 is connected to each of the one or more battery clusters in the energy storage system through a DC interface of the conversion power supply. In an implementation, the DC interface may include multiple interfaces, and each of the interfaces is connected to at least one of the battery clusters. The DC interface may further include an interface connected to the DC bus. Voltages at the interfaces may be 1500V.

Figure 2B:
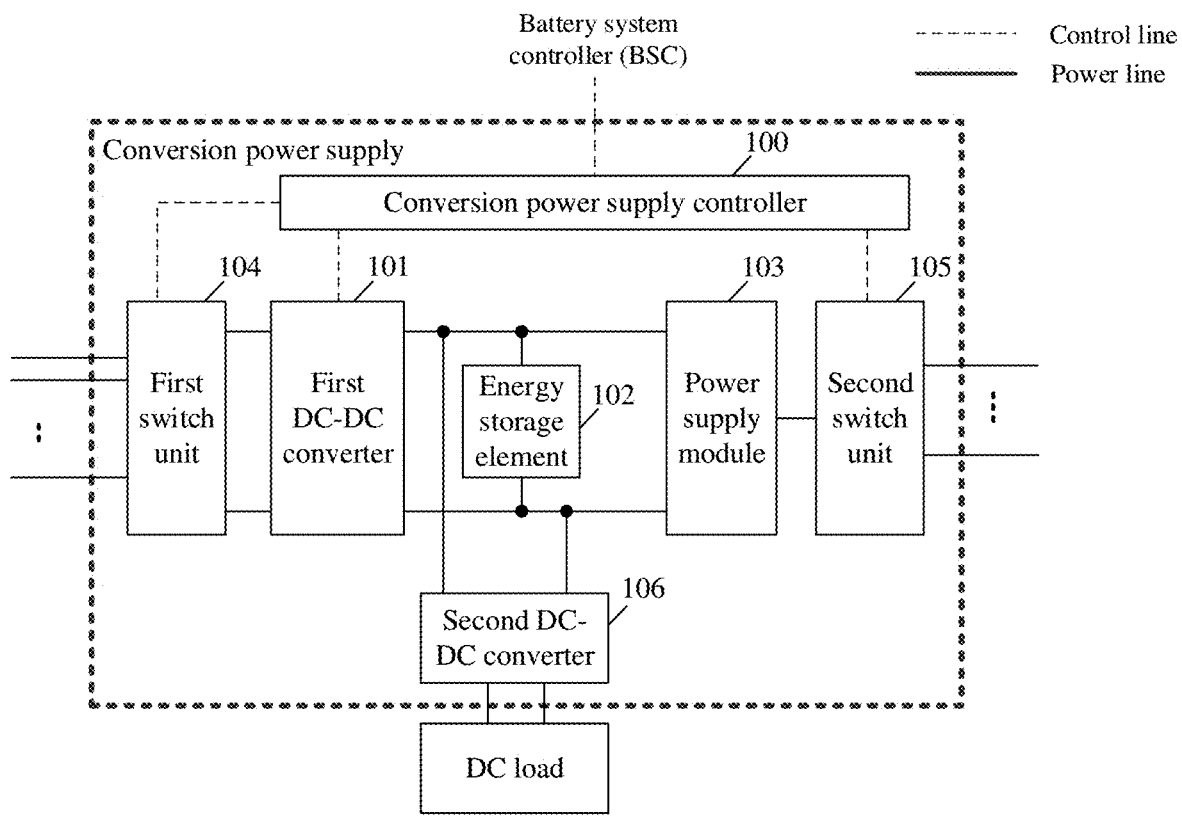
FIG. 2*b* is a schematic structural diagram of a conversion power supply of an energy storage system according to another embodiment of the present disclosure.

In an implementation, a first switch unit 104 as shown in FIG. 2*b* may be arranged between the first side of the first DC-DC converter 101 and the DC interface. Ports on a first side of the first switch unit 104 are respectively connected to the interfaces of the DC interface. A second side of the first switch unit 104 is connected to the first side of the first DC-DC converter 101. The first switch unit 104 is controlled by the conversion power supply controller 100, to selectively connect one of the ports on the first side of the first switch unit 104 to the second side of the first switch unit 104, thereby realizing the selection of multiple DC accesses, and constructing an exclusive interlock to ensure that two DCs are not simultaneously connected.

The second side of the first DC-DC converter 101 and an output terminal of the power supply module 103 are connected to the energy storage element 102. In an implementation, the energy storage element 102 is a single device such as a electrolytic capacitor, a metal film capacitor, a lithium capacitor and a lead-acid battery, and may alternatively be a capacitor pool realized by a capacitor of any type, which is not limited herein, and may be determined depending on the application environment, and all alternatives are within the protection scope of the present disclosure.

An input terminal of the power supply module 103 is connected to an external power supply through a power supply interface of the conversion power supply. The power supply module 103 may be a DC-DC converter or an AC-DC converter. In a case that the power supply module is an AC-DC converter, the external power supply may include at least one of a mains supply and at least one alternator. The alternator may be a diesel, but is not limited thereto and may be determined depending on the application environment, and all alternatives are within the protection scope of the present disclosure. The external power supply may provide 220V AC power. Considering the structure cost and the control complexity, the AC-DC converter is preferably an uncontrolled rectifying converter, but is not limited thereto. The AC-DC converter may alternatively be a rectifier realized by a controllable semiconductor, and may be determined depending on the application environment, and all alternatives are within the protection scope of the present disclosure.

In an implementation, a second switch unit 105 as shown in FIG. 2b may be arranged between the input terminal of the power supply module 103 and the power supply interface. Ports on a first side of the second switch unit 105 are respectively connected to the interfaces in the power supply interface. A second side of the second switch unit 105 is connected to the input terminal of the power supply module 103. The second switch unit 105 is controlled by the conversion power supply controller 100, to selectively connect one of the ports on the first side of the second switch unit 105 to the second side of the second switch unit 105, thereby realizing the selection of multiple AC accesses, and constructing an exclusive interlock to ensure that two ACs are not simultaneously connected.

The working principle is described in detail in the following.

Based on determination that a voltage of a battery cluster among the one or more battery clusters is lower than a preset threshold, the conversion power supply controller 100 controls the power supply module 103 to convert AC power received at the input terminal of the power supply module 103 and output converted power to the energy storage element 102. The first DC-DC converter 101 receives electric energy from the energy storage element 102, that is, the electric energy on the second side of the first DC-DC converter 101, and transmits the electric energy to the first side of the first DC-DC converter 101, under control by the conversion power supply controller 100, to replenish electric energy of the battery cluster and prevent battery failure due to over-discharge.

It is to be noted that, in a case that the first side of the first DC-DC converter 101 is directly connected to the DC interface of the conversion power supply 10 (as shown in FIG. 2a), the conversion power supply 10 simultaneously replenishes electric energies of the battery clusters. In a case that the first side of the first DC-DC converter 101 is connected to the DC interface of the conversion power supply 10 through the first switch unit 105 (as shown in FIG. 2b), the conversion power supply 10 may precisely replenish electric energy of any one of the battery clusters that is in low power or may successively replenish electric energy of multiple battery clusters that are in low power, under control by the conversion power supply controller 100, depending on the application environment, and all alternatives are within the protection scope of the present disclosure.

In an implementation, the preset threshold may be a voltage that triggers an over-discharge warning, or may be higher than the voltage, depending on the application environment, and all alternatives are within the protection scope of the present disclosure.

In a case that the battery system is undervoltage and a main circuit thereof cannot be charged and discharged due to local fault, by constructing the above charging circuit, the conversion power supply 10 of an energy storage system according to the embodiment is powered by the external power supply such as a mains supply or a diesel generator, and the battery clusters are charged through the conversion power supply 10 to prevent battery failure due to over discharge. Moreover, by means of the above working principle, the conversion power supply 10 can realize active electric energy replenishment of the battery cluster and can maintain an autonomous electric energy replenishment channel that prevents the battery clusters from being over-discharged.

Based on the above embodiment, in a preferred embodiment, the conversion power supply 10 includes the first switch unit 104.

The conversion power supply controller 100 in the conversion power supply of the energy storage system may further be configured to control the first DC-DC converter 101 to transmit the electric energy received on the second side of the first DC-DC converter 101 to the first side of the first DC-DC converter 101, and transmit the electric energy to a corresponding interface in the DC interface through the first switch unit 104 to balance electric energy among the battery clusters.

In this case, the conversion power supply 10 further functions to balance the electric energies of the battery clusters; and/or
    the DC interface of the conversion power supply 10 includes the interface for connecting the DC bus, the conversion power supply controller 100 may further be configured to: control the first DC-DC converter 101 to transmit the electric energy received on the second side of the first DC-DC converter to the first side of the first DC-DC converter, and transmit the electric energy to the interface of the DC interface that is connected to the DC bus through the first switch unit 104, to establish a slow start voltage on the DC bus.

In this case, the conversion power supply 10 can further functions to establish the slow-start voltage on the DC bus.

In an implementation, the conversion power supply 10 may simultaneously have the above-mentioned electric energy replenishment function, balance function and slow-start voltage establishment function. Alternatively, the conversion power supply 10 may be configured with any of the above functions according to actual needs, depending on the application environment, and all alternatives are within the protection scope of the present disclosure.

On the basis of the above embodiments, referring to FIG. 2b, the conversion power supply 10 may further include a second DC-DC converter 106.

A first side of the second DC-DC converter 106 is connected to the energy storage element 102.

A second side of the second DC-DC converter 106 is connected to a DC load in the energy storage system through the load interface of the conversion power supply 10. In an implementation, the load interface may include multiple interfaces, and the multiple interfaces are respectively connected to corresponding DC loads. The DC loads may be various controllers in the energy storage system, and may include at least one of: the conversion power supply controller 100, a security controller in the energy storage system, a temperature control unit controller, BSC, cluster-level management unit controllers and a battery over-discharge alarm buzzer. The power supply voltage of the DC loads is 24V DC.

The conversion power supply controller 100 controls the power supply module 103 to output electric energy to the energy storage element 102, and control the second DC-DC converter 106 to receive DC electric energy from the energy storage element 102, convert the DC electric energy and supply power to the DC loads, so as to realize the power supply for the DC loads. In this case, the conversion power supply 10 may have an auxiliary power supply function.

In an implementation, the second DC-DC converter 106 may be a unidirectional buck converter or an isolation buck converter, but is not limited thereto, and may be determined depending on the application environment, and all alternatives are within the protection scope of the present disclosure.

In an implementation, the first DC-DC converter 101 is a bidirectional DC-DC converter that realizes bidirectional buck-boost conversion. Under the control of the conversion power supply controller 100, the first DC-DC converter 101 can not only realize the electric energy replenishment function for the corresponding battery cluster to prevent battery failure due to over-discharge, but also can convert the electric energy of the corresponding battery cluster received on the first side of the first DC-DC converter 101 through the DC interface and output the converted electric energy to the energy storage element 102.

That is, the conversion power supply 10 may obtain electric energy from the external power supply connected to the power supply interface of the conversion power supply 10, and may obtain electric energy from electric energy transmission branches (DC_BUS 1 to DC_BUS n as shown in in FIG. 1) of the battery clusters or the DC bus DC_BUS. For example, the conversion power supply 10 may successively take electric energy from the electric energy transmission branches of the battery clusters, and then supply power to the DC loads inside the energy storage system.

In an implementation, in a case that the mains supply is normal, the conversion power supply controller 100 may control the second DC-DC converter 106 to receive electric energy from the mains supply through the power supply module 103. In a case that the mains supply is abnormal, the conversion power supply controller 100 may control the second DC-DC converter 106 to receive electric energy from the DC interface through the first DC-DC converter 101, and to output the electric energy to the energy storage element 102 instead of the power supply module 106, so that the second DC-DC converter 106 can continue to supply power to the DC loads, to function as an uninterrupted self supply for the DC loads instead of an uninterruptible power supply (UPS).

In the conversion power supply 10 of an energy storage system provided according to the embodiment, the first DC-DC converter 101 connected to the battery clusters or the DC bus of the PCS is designed as a bidirectional buck-boost DC-DC converter. During normal operation, electric energy is obtained from the mains supply or the batteries, and is converted and outputted as a DC power supply of, for example, 24V, used by core controllers. An auxiliary power supply of the energy storage system with AC and DC dual input can be realized. Moreover, the conversion power supply 10 can further realize the auxiliary power supply function of battery DC self supply and effectively prevent the battery failure due to over-discharge through the above bidirectional DC-DC conversion design and corresponding software control, at low system cost.

In an embodiment, the conversion power supply controller 100 may be provided with internal instructions, so that the first DC-DC converter 101 may obtain electric energy from the battery clusters or the DC bus of the PCS, performs voltage reduction and charges the energy storage element 102, or the first DC-DC converter 101 charges the battery clusters by using electric energy form the energy storage element 102, to realize at least one of the following functions: electric energy replenishment, active balance electric energy among the battery clusters, auxiliary power supply, and establishment of a slow-start voltage at the output end of the PCS instead of a conventional slow-start resistor, depending on the application environment, and all alternatives are within the protection scope of the present disclosure.

In addition, in this case, the DC electric energy output by the power supply module 103 may be transmitted to any one of the DC-DC converters through the energy storage element 102, or may be transmitted to the two DC-DC converters simultaneously, depending on the actual needs, and all alternatives are within the protection scope of the present disclosure. In this way, for over discharge caused by equipment maintenance, local power grid faults, or long-term auxiliary power supply during standby, the electric energy replenishment function of the battery clusters may also be realized through the above principle to prevent battery failure due to over-discharge. That is, the conversion power supply of an energy storage system provided according to the embodiment is applicable to situations where the battery clusters trigger an over-discharge warning due to various reasons.

Figure 3A:
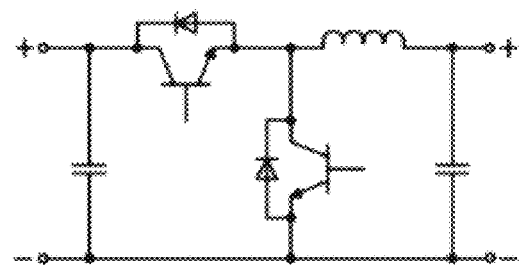
FIGS. 3*a*, 3*b*, 3*c*, 3*d*, 4, 5, 6*a*, 6*b*, 6*c* and 6*d* are schematic structural diagrams of a first DC-DC converter according to embodiments of the present disclosure.
Figure 3B:
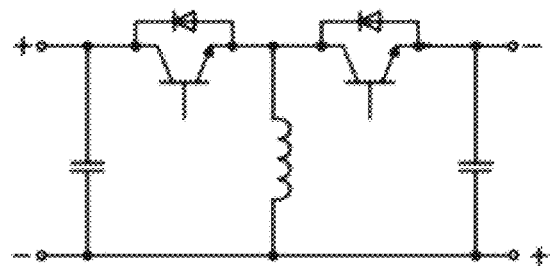
Figure 3C:
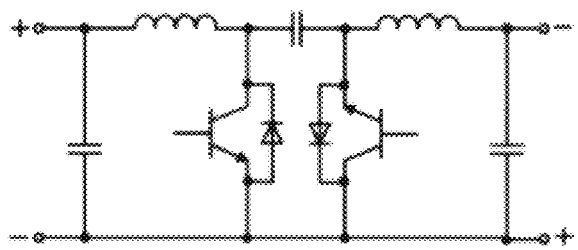
Figure 3D:
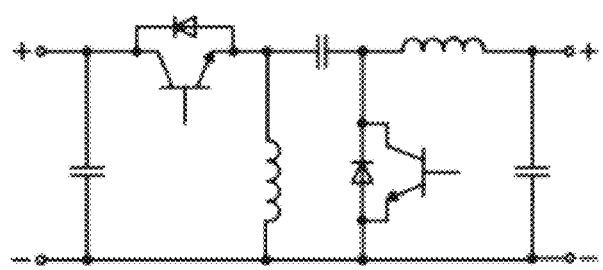

In an implementation, the first DC-DC converter 101 may have multiple selectable topologies, and the simplest topology may be any one of the following: a bidirectional BUCK-BOOST topology (as shown in FIG. 3a), a bidirectional BOOST-BUCK topology (as shown in FIG. 3b), a bidirectional Cuk topology (as shown in FIG. 3c), and a bidirectional Sepic-Zeta topology (as shown in FIG. 3d).

Figure 4:
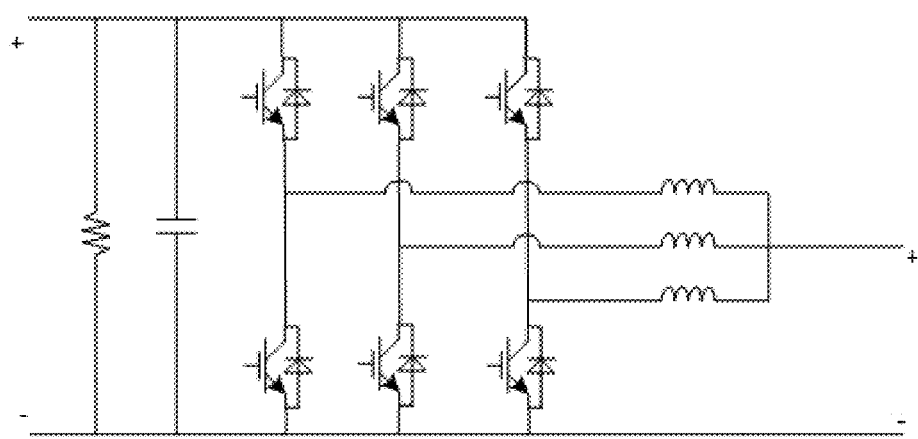

In an implementation, considering power requirements, for example, in a case of a large number of DC loads, the topology of the first DC-DC converter 101 may be dual-topology or a multi-topology of any one of the above topologies, such as a three-phase interleaved parallel DC-DC conversion topology shown in FIG. 4, i.e. triple-topology of the bidirectional BUCK-BOOST topology shown in FIG. 3a. The dual-topology of the bidirectional BUCK-BOOST topology, and the dual-topology and the multi-topology of other topologies, are not described in detail one by one, and all alternatives are within the protection scope of the present disclosure.

Figure 5:
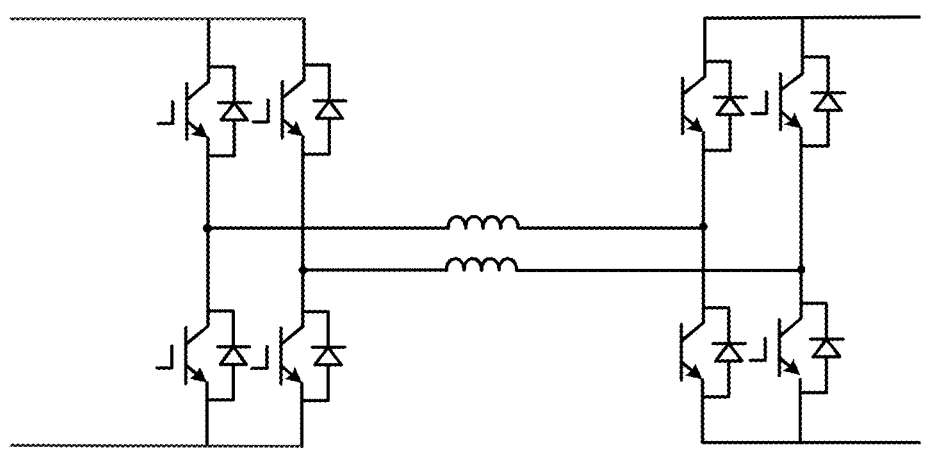
Figure 6A:
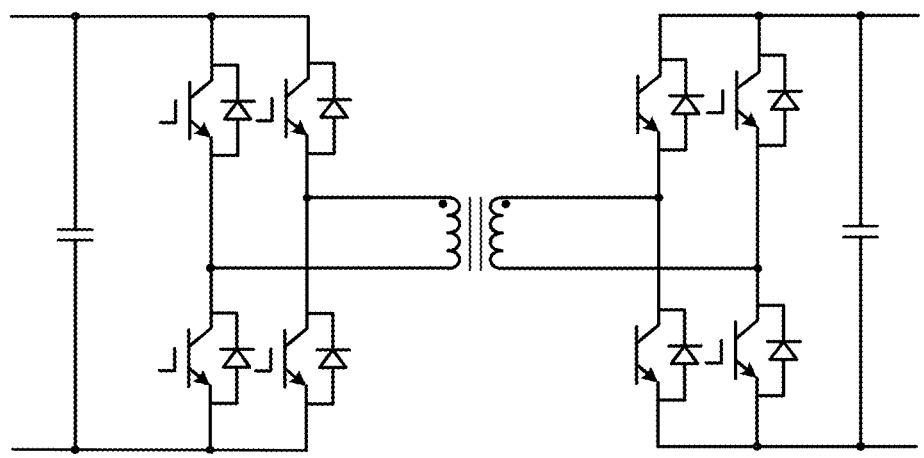
Figure 6B:
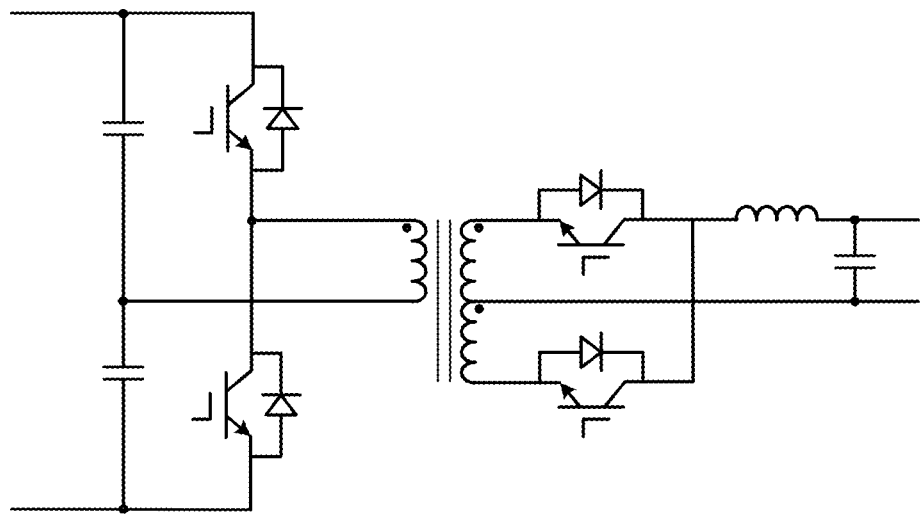
Figure 6C:
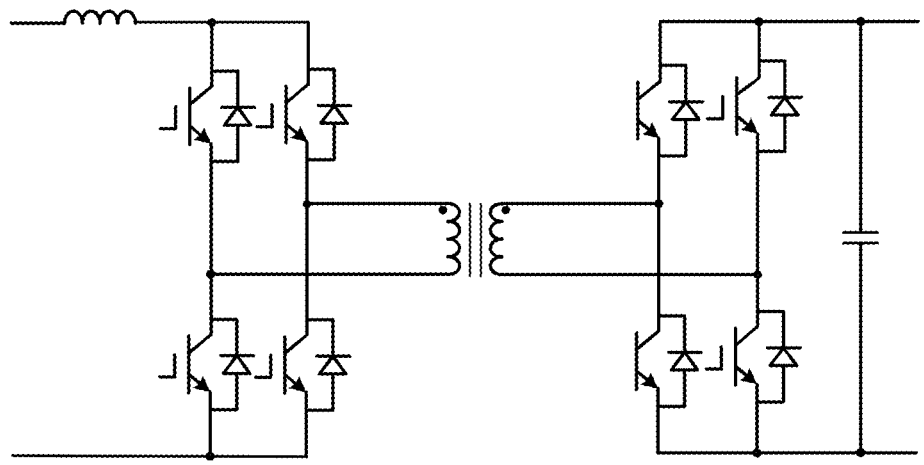
Figure 6D:
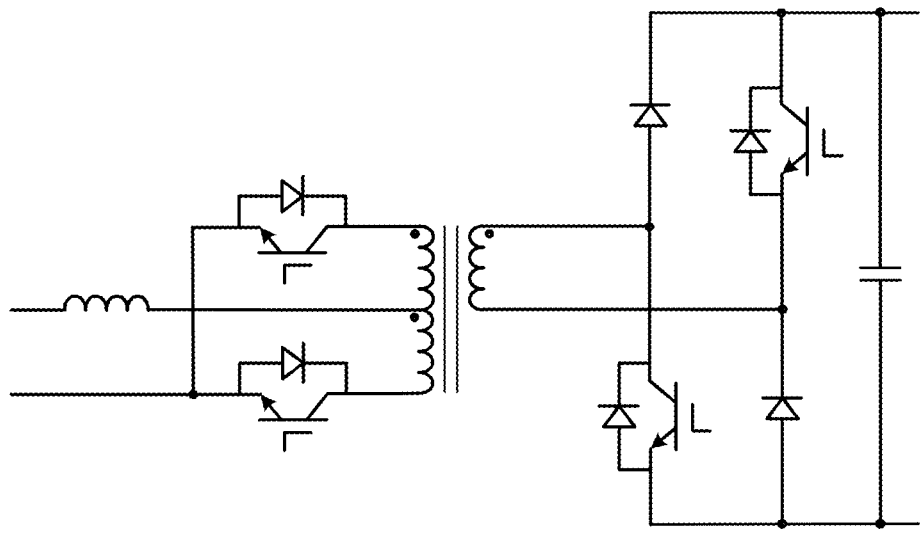

In addition, in a more complicated situation, the topology of the first DC-DC converter 101 may alternatively be a phase-shift full-bridge topology shown in FIG. 5. Alternatively, considering safety, the topology of the first DC-DC converter 101 may be an isolation conversion structure, specifically may be any one of the following: a full-bridge isolation voltage source topology (as shown in FIG. 6*a*), an isolation voltage source topology with a primary side half-bridge circuit and a secondary side push-pull circuit (as shown in FIG. 6*b*), a full-bridge isolation current source topology (as shown in FIG. 6*c*), and an isolation current source topology with a primary side push-pull circuit and a secondary side hybrid-bridge circuit (as shown in FIG. 6*d*).

The switches in the various topologies mentioned above are controlled by the conversion power supply controller 100, and corresponding control signals may be pulse width modulation (PWM) signals, and the control processes thereof are not be described in detail herein.

The above are some topology examples of the first DC-DC converter 101, and present disclosure is not limited thereto. Any topology that causes the first DC-DC converter 101 to realize bidirectional buck-boost conversion falls within the protection scope of the present disclosure.

An autonomous electric power replenishment method for an energy storage system is provided according to another embodiment of the present disclosure, and is applied to the conversion power supply controller in the conversion power supply of an energy storage system described in above embodiments. For the specific structures and working principles of the energy storage system and the conversion power supply of the energy storage system, reference may be made to the above embodiments, which are not repeated here.

Figure 7:
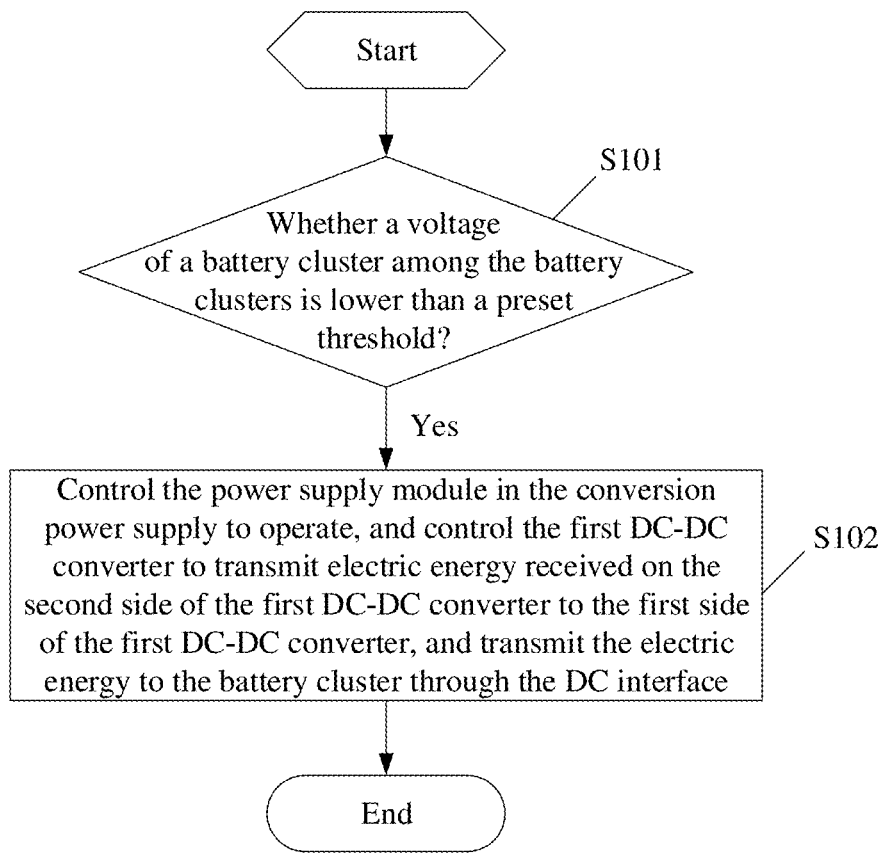
FIG. 7 is a flowchart of an autonomous electric energy replenishment method for an energy storage system according to an embodiment of the present disclosure.

Referring to FIG. 7, the autonomous electric energy replenishment method includes the following steps S101 to S102.

In step S101, whether a voltage of a battery cluster among the one or more battery clusters in the energy storage system is lower than a preset threshold is determined.

In an implementation, the preset threshold may be a voltage that triggers an over-discharge warning, or may be higher than the voltage, depending on the application environment, and all alternatives are within the protection scope of the present disclosure.

If the voltage of the battery cluster is lower than the preset threshold, step S102 is executed.

In step S102, the power supply module in the conversion power supply is controlled to operate, the first DC-DC converter transmits electric energy received on the second side of the first DC-DC converter to the first side of the first DC-DC converter and transmits the electric energy to the battery cluster through the DC interface.

In a case that the conversion power supply includes the first switch unit, after the first DC-DC converter transmits the electric energy received on the second side of the first DC-DC converter to the first side of the first DC-DC converter, the autonomous electric energy replenishment method further includes: controlling the first switch unit to act, to transmit the electric energy to the battery cluster among the battery clusters of which the voltage is lower than the preset threshold. In this case, through the collaborative work of the power supply module, the first DC-DC converter and the first switch unit, precise electric energy replenishment or successive electric energy replenishment for the over-discharge battery clusters can be realized.

Figure 8:
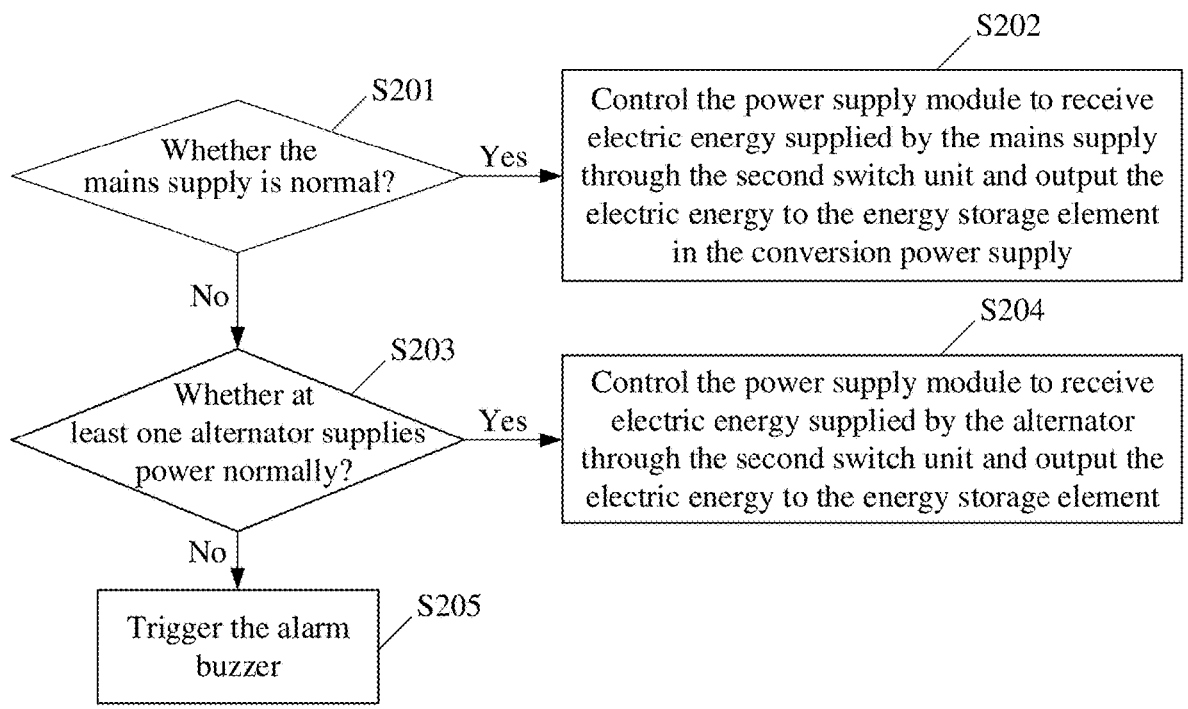
FIG. 8 is a flowchart showing partial procedure of an autonomous electric energy replenishment method for an energy storage system according to an embodiment of the present disclosure.

In a case that external power supply connected to the conversion power supply includes a mains supply and at least one alternator, and the conversion power supply includes the second switch unit, in step S102, the controlling the power supply module in the control conversion power supply to operate in step S102 may include the following steps S201 to S205 shown in FIG. 8.

In step S201, whether the mains supply is normal is determined.

Based on determination that the mains supply is normal, step S202 is executed. Based on determination that the mains supply is abnormal, step S203 is executed.

In step S202, the power supply module is controlled to receive electric energy supplied by the mains supply through the second switch unit and to output the electric energy to the energy storage element in the conversion power supply.

In this case, the conversion power supply uses the electric energy supplied by the mains supply to reversely charge the battery clusters.

In step S203, whether the at least one alternator supplies power normally is determined.

Based on determination that the at least one alternator supplies power normally, step S204 is executed. Based on determination that no alternator supplies power normally, step S205 is executed.

In step S204, the power supply module is controlled to receive electric energy supplied by the alternator through the second switch unit and to output the electric energy to the energy storage element.

In this case, the conversion power supply uses the electric energy supplied by the alternator to reversely charge the battery clusters.

In step S205, an alarm buzzer is triggered.

That is, in an implementation, it is preferred to use the mains supply to realize electric energy replenishment for the battery clusters. In the case that the mains supply is abnormal, the alternator is used as a substitute to replenish electric energy. In a case that the mains supply and the alternator are abnormal, the alarm buzzer is triggered to notify the operator in time for maintenance, so as to avoid damage to equipment of the inverter.

Figure 9:
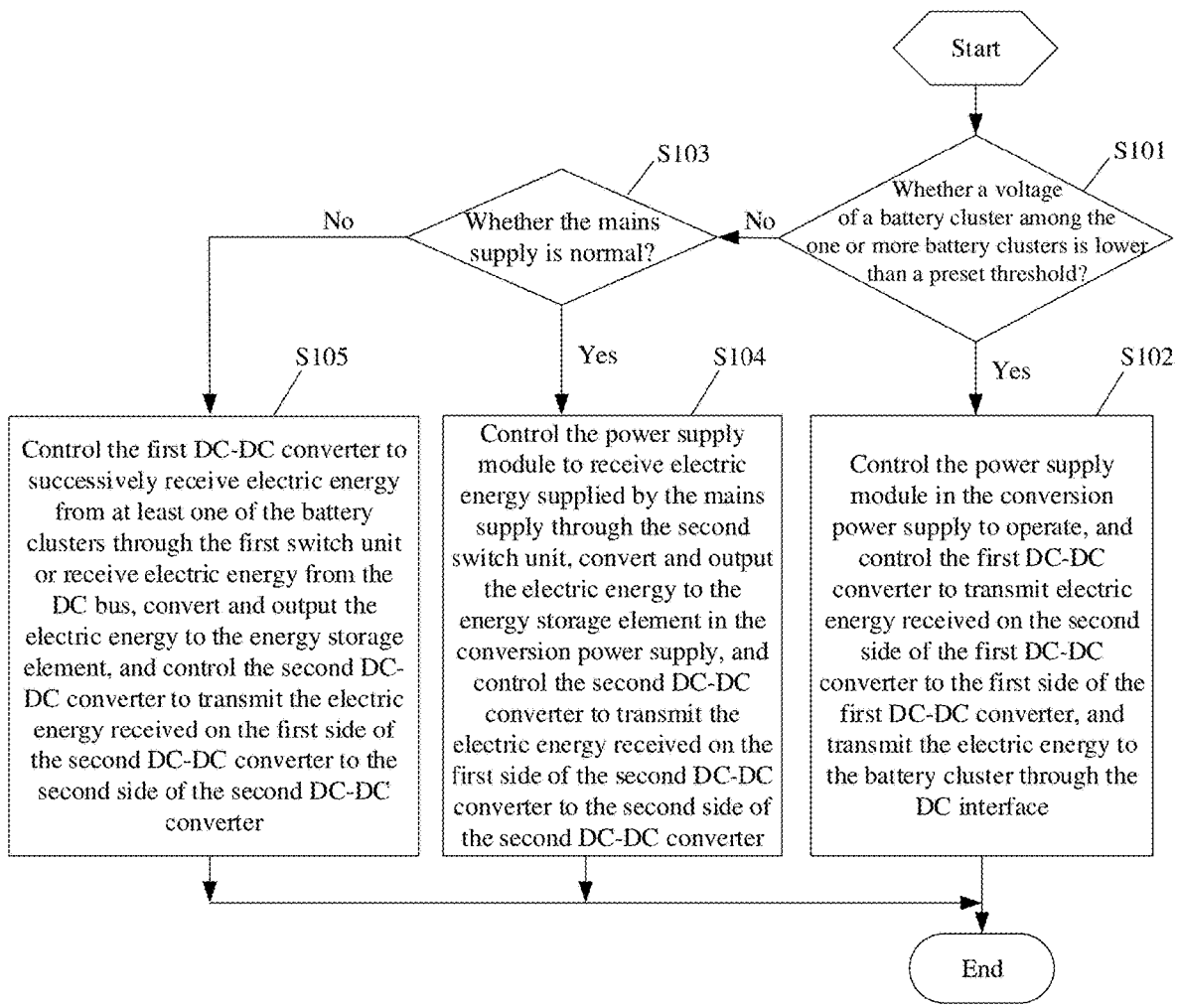
FIG. 9 is a flowchart of an autonomous electric energy replenishment method for an energy storage system according to another embodiment of the present disclosure.

Moreover, in a case that the external power supply connected to the conversion power supply include the mains supply and the at least one alternator, and the conversion power supply includes the first switch unit, the second switch unit and the second DC-DC converter, after step S101, the autonomous electric energy replenishment method may further include the following steps S103 to S105 shown in FIG. 9 (shown on the basis of FIG. 7 as an example).

Based on determination that the no battery cluster has a voltage lower than the preset threshold, step S103 is executed.

In step S103, whether the mains supply is normal is determined.

Based on determination that the mains supply is normal, step S104 is executed. Based on determination that the mains supply is abnormal, step S105 is executed.

In step S104, the power supply module is controlled to receive electric energy supplied by the mains supply through the second switch unit, convert and output the electric energy to the energy storage element in the conversion power supply, and the second DC-DC converter is controlled to transmit electric energy received on the first side of the second DC-DC converter to the second side of the second DC-DC converter.

In step S105, the first DC-DC converter is controlled to successively receive electric energy from at least one of the battery clusters or receive electric energy from the DC bus through the first switch unit, convert and output the electric energy to the energy storage element, and the second DC-DC converter is controlled to transmit the electric energy received on the first side of the second DC-DC converter to the second side of the second DC-DC converter.

That is, in an implementation, it is preferred to use the mains supply to supply power to the DC loads. In the case that the mains supply is abnormal, the self supply of the battery clusters is used as a substitute to realize the auxiliary power supply function.

In addition, in order to realize the autonomous balance control described in the above embodiments, the autonomous electric energy replenishment method may further include: at any time, determining whether electric energies of the battery clusters are balanced. Based on determination that an unbalanced battery cluster exists, the power supply module is controlled to operate, and the first DC-DC converter transmits the electric energy received on the second side of the first DC-DC converter to the first side of the first DC-DC converter, and the electric energy is transmitted to the corresponding battery cluster through the first switch unit.

In order to realize the above slow-start function, the autonomous electric energy replenishment method may further include: at any time, determining whether a slow-start voltage is to be established for the DC bus for external connection of the energy storage system. If the slow-start voltage is to be established, the power supply module is controlled to operate, and the first DC-DC converter transmits the electric energy received on the second side of the first DC-DC converter to the first side of the first DC-DC converter, and transmits the electric energy to the DC bus through the first switch unit.

With the autonomous electric energy replenishment method provided according to the embodiment, the battery clusters can be charged from the energy storage element through the first DC-DC converter that can realize the bidirectional buck-boost conversion, to realize the electric energy replenishment function, or the electric energy may be taken from the battery clusters or the DC bus of the PCS, and is used for charging the energy storage element after voltage reduction, to realize uninterrupted self supply for the DC loads. In addition, an active balance control can be maintained among the battery clusters and the slow-start voltage can be established at the output end of PCS. That is, multiple functions can be realized with low cost and simple control logic.

The same and similar parts between the various embodiments in the description can be referred to each other, and each of the embodiments focuses on differences from other embodiments. In particular, since systems or system embodiments are basically similar to method embodiments, the description is relatively simple, and reference may be made to parts of the description of the method embodiments for relevant parts. The systems and the system embodiments described above are only illustrative, and units described as separate components may or may not be physically separated. The components shown as units may or may not be physical units, that is, may be located in one place or distributed in multiple network units. Part or all of the modules may be selected according to actual needs to achieve the purpose of the solutions of the embodiments. Those skilled in the art can understand and implement without creative efforts.

Professionals can further realize that units and algorithm steps of the examples described in conjunction with the embodiments disclosed in the description can be implemented by electronic hardware, computer software, or a combination of the two. In order to clearly illustrate the interchangeability of hardware and software, components and steps of the examples have been generally described in terms of functions in the above description. Whether the functions are executed by hardware or software depends on specific applications and design constraints of the technical solutions. Those skilled in the art may use different methods to implement the described functions for each specific application, and such implementation should not be considered beyond the scope of the present disclosure.

For the above description of the disclosed embodiments, features described in the embodiments in the description may be interchanged or combined with each other, so that those skilled in the art can implement or use the present disclosure. Various modifications to the embodiments are apparent to those skilled in the art. General principles defined herein may be implemented in other embodiments without departing from spirits or scopes of the present disclosure. Therefore, the present disclosure is not limited to the embodiments shown herein, but is subject to the widest scope consistent with the principles and novel features disclosed herein.

The invention claimed is:

1. A conversion power supply of an energy storage system, comprising: a conversion power supply controller, an energy storage element, a first DC-DC converter and a power supply module, wherein,
   a first side of the first DC-DC converter is connected to one or more battery clusters in the energy storage system through a DC interface of the conversion power supply;
   a second side of the first DC-DC converter and an output terminal of the power supply module are connected to the energy storage element;
   an input terminal of the power supply module is connected to an external power supply through a power supply interface of the conversion power supply;
   the conversion power supply controller is configured to, based on determination a voltage of a battery cluster among the one or more battery clusters is lower than a preset threshold, control the power supply module to output electric energy to the energy storage element, and control the first DC-DC converter to transmit electric energy received on the second side of the first DC-DC converter to the first side of the first DC-DC converter to replenish electric energy of the battery cluster;
   wherein the external power supply comprises a mains supply and at least one alternator, the conversion power supply comprises a second switch unit, and the power supply module is controlled to output the electric energy to the energy storage element by:
   determining whether the mains supply is normal;
   based on determination that the mains supply is normal, controlling the power supply module to receive electric energy supplied by the mains supply through the second switch unit and output the electric energy to the energy storage element in the conversion power supply;
   based on determination that the mains supply is abnormal, determining whether the at least one alternator supplies power normally;
   based on determination that the at least one alternator supplies power normally, controlling the power supply module to receive electric energy supplied by the at least one alternator through the second switch unit and output the electric energy to the energy storage element; and
   based on determination that no alternator supplies power normally, triggering an alarm.

2. The conversion power supply of an energy storage system according to claim 1, further comprising: a first switch unit, wherein
- ports on a first side of the first switch unit are respectively connected to interfaces in the DC interface of the conversion power supply;
- a second side of the first switch unit is connected to the first side of the first DC-DC converter; and
- the first switch unit is controlled by the conversion power supply controller to selectively connect one of the ports on the first side of the first switch unit to the second side of the first switch unit.

3. The conversion power supply of an energy storage system according to claim 2, wherein the conversion power supply controller is further configured to control the first DC-DC converter to transmit the electric energy received on the second side of the first DC-DC converter to the first side of the first DC-DC converter, and transmit the electric energy to a corresponding one of the interfaces in the DC interface of the conversion power supply through the first switch unit, to balance electric energy among the one or more battery clusters.

4. The conversion power supply of an energy storage system according to claim 2, wherein the DC interface of the conversion power supply further comprises an interface connected to a DC bus for external connection of the energy storage system.

5. The conversion power supply of an energy storage system according to claim 4, wherein the conversion power supply controller is further configured to control the first DC-DC converter to transmit the electric energy received on the second side of the first DC-DC converter to the first side of the first DC-DC converter, and transmit the electric energy to the interface in the DC interface of the conversion power supply that is connected to the DC bus through the first switch unit, to establish a slow start voltage on the DC bus.

6. The conversion power supply of an energy storage system according to claim 1, further comprising: a second DC-DC converter, wherein
- a first side of the second DC-DC converter is connected to the energy storage element;
- a second side of the second DC-DC converter is connected to a DC load in the energy storage system through a load interface of the conversion power supply;
- the conversion power supply controller is further configured to: control the power supply module to output electric energy to the energy storage element, and control the second DC-DC converter to supply power to the DC load.

7. The conversion power supply of an energy storage system according to claim 6, wherein
- the first DC-DC converter is a bidirectional DC-DC converter; and
- the conversion power supply controller is further configured to: control the first DC-DC converter to transmit electric energy received on the first side of the first DC-DC converter to the second side of the first DC-DC converter and output the electric energy to the energy storage element instead of the power supply module, to cause the second DC-DC converter to supply power to the DC load.

8. The conversion power supply of an energy storage system according to claim 6, wherein a topology of the first DC-DC converter is a single-topology, a dual-topology or a multi-topology of any one of: a bidirectional BUCK-BOOST topology, a bidirectional BOOST-BUCK topology, a bidirectional Cuk topology and a bidirectional Sepic-Zeta topology;
- a topology of the first DC-DC converter is a phase-shift full-bridge topology; or
- a topology of the first DC-DC converter is any one of: a full-bridge isolation voltage source topology, an isolation voltage source topology with a primary side half-bridge circuit and a secondary side push-pull circuit, a full-bridge isolation current source topology, and an isolation current source topology with a primary side push-pull circuit and a secondary side hybrid-bridge circuit.

9. The conversion power supply of an energy storage system according to claim 6, wherein the second DC-DC converter is a unidirectional buck converter or an isolation buck converter.

10. The conversion power supply of an energy storage system according to claim 6, wherein the DC load comprises at least one of: the conversion power supply controller, a security controller in the energy storage system, a temperature control unit controller, a battery system controller, a cluster-level management unit controller and a battery over-discharge alarm buzzer.

11. The conversion power supply of an energy storage system according to claim 1, wherein
the power supply module is an AC-DC converter.

12. The conversion power supply of an energy storage system according to claim 11, wherein the AC-DC converter is an uncontrolled rectification converter.

13. The conversion power supply of an energy storage system according to claim 1, wherein
- ports on a first side of the second switch unit are respectively connected to interfaces in the power supply interface;
- a second side of the second switch unit is connected to the input terminal of the power supply module;
- the second switch unit is controlled by the conversion power supply controller to selectively connect one of the ports on the first side of the second switch unit to the second side of the second switch unit.

14. The conversion power supply of an energy storage system according to claim 1, wherein the energy storage element is any one of: an electrolytic capacitor, a metal film capacitor, a lithium capacitor and a lead-acid battery.

15. An autonomous electric energy replenishment method for an energy storage system, applied to the conversion power supply controller in the conversion power supply of an energy storage system according to claim 1, comprising:
- determining whether a voltage of a battery cluster among the one or more battery clusters in the energy storage system is lower than a preset threshold;
- based on determination that the voltage of the battery cluster is lower than the preset threshold, controlling the power supply module in the conversion power supply to operate, and controlling the first DC-DC converter to transmit the electric energy received on the second side of the first DC-DC converter to the first side of the first DC-DC converter, and transmitting the electric energy to the battery cluster through the DC interface;
- wherein the external power supply connected to the conversion power supply comprise a mains supply and at least one alternator, the conversion power supply comprises a second switch unit, and the controlling the power supply module in the conversion power supply to operate comprises:

determining whether the mains supply is normal;

based on determination that the mains supply is normal, controlling the power supply module to receive electric energy supplied by the mains supply through the second switch unit and output the electric energy to the energy storage element in the conversion power supply;

based on determination that the mains supply is abnormal, determining whether the at least one alternator supplies power normally;

based on determination that the at least one alternator supplies power normally, controlling the power supply module to receive electric energy supplied by the at least one alternator through the second switch unit and output the electric energy to the energy storage element; and based on determination that no alternator supplies power normally, triggering an alarm.

16. The autonomous electric energy replenishment method for an energy storage system according to claim 15, wherein the conversion power supply comprises a first switch unit, and after the first DC-DC converter transmits the electric energy received on the second side of the first DC-DC converter to the first side of the first DC-DC converter, the autonomous electric energy replenishment method further comprises:

controlling the first switch unit to act, to transmit the electric energy to the battery cluster with the voltage lower than the preset threshold.

17. The autonomous electric energy replenishment method for an energy storage system according to claim 16, further comprising:

determining whether electric energies of the battery clusters are balanced;

based on determination that an unbalanced battery cluster exists, controlling the power supply module to operate, and controlling the first DC-DC converter to transmit the electric energy received on the second side of the first DC-DC converter to the first side of the first DC-DC converter, and transmitting the electric energy to the unbalanced battery cluster through the first switch unit.

18. The autonomous electric energy replenishment method for an energy storage system according to claim 16, further comprising:

determining whether a slow-start voltage is to be established for a DC bus for external connection of the energy storage system;

based on determination that the slow-start voltage is to be established for the DC bus, controlling the power supply module to operate, and controlling the first DC-DC converter to transmit the electric energy received on the second side of the first DC-DC converter to the first side of the first DC-DC converter, and transmitting the electric energy to the DC bus through the first switch unit.

19. The autonomous electric energy replenishment method for an energy storage system according to claim 15, wherein the triggering an alarm based on determination that no alternator supplies power normally is performed by triggering an alarm buzzer.

20. The autonomous electric energy replenishment method for an energy storage system according to claim 15, wherein the external power supply connected to the conversion power supply comprise a mains supply and at least one alternator, the conversion power supply comprises a first switch unit, a second switch unit and a second DC-DC converter, and after the determining whether a voltage of a battery cluster among the one or more battery clusters in the energy storage system is lower than the preset threshold, the autonomous electric energy replenishment method further comprises:

based on determination that a voltage of no battery cluster among the one or more battery clusters is lower than the preset threshold, determining whether the mains supply is normal;

based on determination that the mains supply is normal, controlling the power supply module to receive electric energy supplied by the mains supply through the second switch unit, convert and output the electric energy to the energy storage element in the conversion power supply, and controlling the second DC-DC converter to transmit the electric energy received on a first side of the second DC-DC converter to a second side of the second DC-DC converter;

based on determination that the mains supply is abnormal, controlling the first DC-DC converter to successively receive, through the first switch unit, electric energy from at least one of the one or more battery clusters or receive electric energy from a DC bus for external connection of the energy storage system, convert and output the electric energy to the energy storage element, and controlling the second DC-DC converter to transmit the electric energy received on the first side of the second DC-DC converter to the second side of the second DC-DC converter.

* * * * *